US012577938B2

(12) United States Patent
Shi et al.

(10) Patent No.: US 12,577,938 B2
(45) Date of Patent: Mar. 17, 2026

(54) WIND POWER GENERATION APPARATUS AND METHOD

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

(72) Inventors: Zhentang Shi, Dalian (CN); Hongyang Zhang, Dalian (CN); Cuicui Dong, Dalian (CN); Jie Dong, Dalian (CN); Linan Tao, Dalian (CN); Jun Li, Dalian (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

( * ) Notice: Subject to any disclaimer, the term of this patent is extended or adjusted under 35 U.S.C. 154(b) by 71 days.

(21) Appl. No.: 18/705,338

(22) PCT Filed: Oct. 25, 2022

(86) PCT No.: PCT/CN2022/127337
§ 371 (c)(1),
(2) Date: Apr. 26, 2024

(87) PCT Pub. No.: WO2023/072056
PCT Pub. Date: May 4, 2023

(65) Prior Publication Data
US 2025/0223943 A1 Jul. 10, 2025

(30) Foreign Application Priority Data
Oct. 29, 2021 (CN) .......................... 202111267812.9

(51) Int. Cl.
| | |
|---|---|
| *F03D 7/04* | (2006.01) |
| *F03D 9/11* | (2016.01) |
| *F03D 9/25* | (2016.01) |

(52) U.S. Cl.
CPC ................. *F03D 7/04* (2013.01); *F03D 9/11* (2016.05); *F03D 9/25* (2016.05); *F05B 2220/706* (2013.01); *F05B 2270/32* (2013.01)

(58) Field of Classification Search
CPC ..... F03D 7/04; F03D 7/00; F03D 9/11; F03D 9/25; F03D 9/19; F05B 2270/101;
(Continued)

(56) References Cited

U.S. PATENT DOCUMENTS

| | | |
|---|---|---|
| 4,201,635 A | 5/1980 | Muller |
| 2008/0100169 A1 | 5/2008 | Young |
| | (Continued) | |

FOREIGN PATENT DOCUMENTS

| | | |
|---|---|---|
| CN | 1836974 A | 9/2006 |
| CN | 102978656 A | 3/2013 |
| | (Continued) | |

*Primary Examiner* — Charles Reid, Jr.
(74) *Attorney, Agent, or Firm* — NKL Law; Allen Xue

(57) ABSTRACT

The wind power generation apparatus has an acquisition unit, a wind turbine, a generator, an electric power storage unit and a controller. The acquisition unit acquires a wind power value. The controller selects, according to the wind power value, the wind turbine to perform the following tasks: when the wind power value is between a first threshold value and a second threshold value, the wind turbine only drives the generator to generate power; when the wind power value is greater than the second threshold value, the wind turbine simultaneously drives the generator and the (Continued)

electric power storage unit to charge; when the wind power value is less than the first threshold value, the wind turbine only drives the electric power storage unit to charge or drives the electric power storage unit to output induced electric energy to the outside.

13 Claims, 7 Drawing Sheets

(58) Field of Classification Search
CPC ........... F05B 2220/706; F05B 2270/32; F05B 2260/42; H01M 2220/10; H01M 10/46; H02J 2300/28; H02J 3/32; H02J 3/381; H02J 7/34; Y02E 10/72; Y02E 70/30; Y02E 10/70; C25B 9/19; C25B 9/65; C25B 15/023; C25C 7/00; C25C 7/06
USPC ...................................................... 290/44, 55
See application file for complete search history.

(56) References Cited

U.S. PATENT DOCUMENTS

| | | | | |
|---|---|---|---|---|
| 2010/0078940 | A1* | 4/2010 | Kondo | .................... F03D 7/048 |
| | | | | 290/44 |
| 2010/0295305 | A1* | 11/2010 | Mahawili | ............. F03D 7/0244 |
| | | | | 290/44 |
| 2012/0306202 | A1 | 12/2012 | Takahashi et al. | |
| 2013/0093401 | A1 | 4/2013 | Botts | |
| 2014/0035509 | A1* | 2/2014 | Baruh | ...................... B63H 9/10 |
| | | | | 414/373 |
| 2016/0233690 | A1 | 8/2016 | Kiuchi et al. | |
| 2020/0166017 | A1 | 5/2020 | Hansen et al. | |
| 2020/0248666 | A1 | 8/2020 | Lee | |

FOREIGN PATENT DOCUMENTS

| | | |
|---|---|---|
| CN | 106191915 A | 12/2016 |
| CN | 106329033 A | 1/2017 |
| CN | 107142489 A | 9/2017 |
| CN | 110438517 A | 11/2019 |
| EP | 666633 A1 | 8/1995 |
| GB | 2461264 A | 12/2009 |
| JP | 2002285949 A | 10/2002 |
| JP | 2008278716 A | 11/2008 |
| JP | 2010242507 A | 10/2010 |
| JP | 4824696 B2 | 11/2011 |
| JP | 2016149839 A | 8/2016 |
| RU | 2171913 C1 | 8/2001 |
| RU | 2201648 C2 | 3/2003 |
| RU | 2239722 C2 | 11/2004 |
| RU | 2596904 C2 | 9/2016 |
| WO | 2011058170 A1 | 5/2011 |
| WO | 2018105231 A1 | 6/2018 |

* cited by examiner

WIND POWER GENERATION APPARATUS AND METHOD

CROSS REFERENCE TO RELATED APPLICATIONS

This application is a U.S. national stage entry of PCT International Application No. PCT/CN2022/127337, filed on Oct. 25, 2022, which claims the benefits of Chinese Patent Application No. 202111267812.9, filed on Oct. 29, 2021, the contents of each is incorporated herein by reference in its entirety.

FIELD OF THE INVENTION

The present disclosure relates to the field of renewable power, in particular to a wind power generation apparatus and method.

BACKGROUND OF THE INVENTION

Wind power generation (wind turbine generator) is affected by natural conditions, and the generated electric energy has great fluctuation, which will have a corresponding negative impact on the stability of the grid that it supplies.

In order to adjust the stability of wind power generation, electric power storage (energy storage) devices can be set up to store electricity during the peak period of wind power generation, and a part of electric energy can be stored to avoid the waste caused by the inability of the grid to absorb an excessive amount of electricity generated. Usually, the electric power storage devices are supplied by AC-DC rectifiers. Then, in the valley period of wind power generation, the electric power storage devices supply auxiliary power to the grid through the DC-AC inverters to alleviate the supply shortage of the grid. There are also methods of incorporating rectifiers and inverters using four quadrant power electronic converters.

In the prior art, it is generally necessary to provide a generator to convert the mechanical energy of the wind turbine into AC power, and then an AC-DC power converter provides DC power for charging and discharging the electric power storage device. In general, a centralized energy storage device is provided on the substation side of a wind farm, and energy storage devices for distributed wind power units are also less common, especially for single units, where the associated battery group is used only as a backup source of the unit, and AC/DC rectifiers are also needed for charging.

However, the energy storage mode in the prior art suffers from the disadvantages of using AC-DC power electronic converters and excessive energy loss during the energy conversion process. Uncontrolled and semi-controlled power electronic converters generally generate large harmonics.

SUMMARY OF THE INVENTION

An objective of embodiments of the present disclosure to provide a wind power generation apparatus and method that can efficiently convert wind energy into electrical energy, and improve the power output and stability of the wind power unit.

The present disclosure proposes a wind power generation apparatus, including: an acquisition unit, a wind turbine, a generator, an electric power storage unit, and a controller, wherein the acquisition unit is configured to acquire a wind power value; the controller is configured to control, according to the wind power value, the wind turbine to drive the generator to generate power and/or to drive the electric power storage unit to charge, comprising: if the wind power value is between a first wind power threshold value and a second wind power threshold value, the wind turbine only drives the generator to generate power; if the wind power value is greater than the second wind power threshold value, the wind turbine simultaneously drives the generator and the electric power storage unit to charge; if the wind power value is less than the first wind power threshold value, the wind turbine only drives the electric power storage unit to charge or drives the electric power storage unit to output induced electric energy to the outside, wherein the first wind power threshold value is less than the second wind power threshold value.

Optionally, the electric power storage unit includes a magnetic circuit and at least one group of a battery; driving the electric power storage unit to charge by the wind turbine includes: driving relative rotation between the magnetic circuit and the battery by the wind turbine to form a rotating magnetic field applied to the battery, and generating an induced current under the rotating magnetic field by the battery for charging the electric power storage unit; and the electric power storage unit is further configured to output induced electric energy to a grid through an inverter.

Optionally, the magnetic circuit is a rotatable magnetic circuit used for generating a magnetic field surrounding the battery; and driving the electric power storage unit to charge by the wind turbine further includes: driving the rotatable magnetic circuit and/or the battery to rotate to generate a rotating magnetic field by the wind turbine.

Optionally, the battery is annular, or a plurality of batteries form an annular shape.

Optionally, the magnetic circuit includes a rotating shaft and at least one pair of pole shoes; each pair of pole shoes includes two pole shoes disposed above and below or right and left of the battery for generating a magnetic field surrounding the battery; and the rotating shaft is used for driving the battery or pole shoes such that the battery generates an induced current in the magnetic field, the induced current being used for charging the battery.

Optionally, the magnetic circuit generated by the pole shoes passes through the battery, and the battery forms an induced potential and an induced current in a rotating magnetic field generated by the magnetic circuit.

Optionally, a magnetic-curve of the rotatable magnetic circuit is not parallel to a tangent direction of the rotation of the rotatable magnetic circuit, and the magnetic-curve of the rotatable magnetic circuit and the rotational tangent direction of the rotatable magnetic circuit are not perpendicular to an electrolyte diaphragm; and the battery generates an induced potential under the action of the rotating magnetic field, and a direction of the induced potential is consistent with a direction of positive and negative electrodes of the battery.

The present disclosure also proposes a wind power generation method, including: acquiring a wind power value; and controlling, according to the wind power value, a wind turbine to drive a generator to generate power and/or the wind turbine to drive an electric power storage unit to charge, including: if the wind power value is between a first wind power threshold value and a second wind power threshold value, only driving the generator to generate power by the wind turbine; if the wind power value is greater than the second wind power threshold value, simultaneously driving the generator and the electric power storage unit to charge by the wind turbine; and if the wind power value is less than the first wind power threshold value, only driving the electric power storage unit to charge or driving the electric power storage unit to output induced electric energy to the outside by the wind turbine, wherein the first wind power threshold value is less than the second wind power threshold value.

Optionally, the first wind threshold is 2-5 m/s and the second wind threshold is 10-25 m/s.

Optionally, the wind power generation method further includes: regulating a speed at which the electric power storage unit is charged according to the wind power value.

Optionally, the electric power storage unit includes a magnetic circuit and at least one group of a battery; driving the electric power storage unit to charge by the wind turbine includes: driving relative rotation between the magnetic circuit and the battery by the wind turbine to form a rotating magnetic field applied to the battery, and generating an induced current under the rotating magnetic field by the battery for charging the electric power storage unit; and the electric power storage unit is further configured to output induced electric energy to a grid through an inverter.

Optionally, the magnetic circuit is a rotatable magnetic circuit used for generating a magnetic field surrounding the battery; and driving the electric power storage unit to charge by the wind turbine further includes: driving the rotatable magnetic circuit and/or the battery to rotate to generate a rotating magnetic field by the wind turbine.

Optionally, the battery is annular, or a plurality of batteries form an annular shape.

Optionally, the magnetic circuit includes a rotating shaft and at least one pair of pole shoes; each pair of pole shoes includes two pole shoes disposed above and below or right and left of the battery for generating a magnetic field surrounding the battery; and the rotating shaft is used for driving the battery or pole shoes such that the battery generates an induced current in the magnetic field, the induced current being used for charging the battery.

Optionally, the magnetic circuit generated by the pole shoes passes through the battery, and the battery forms an induced potential and an induced current in a rotating magnetic field generated by the magnetic circuit.

Optionally, a magnetic-curve of the rotatable magnetic circuit is not parallel to a tangent direction of the rotation of the rotatable magnetic circuit, and the magnetic-curve of the rotatable magnetic circuit and the tangent direction of the rotation of the rotatable magnetic circuit are not perpendicular to an electrolyte diaphragm; and the battery generates an induced potential under the action of the rotating magnetic field, and a direction of the induced potential is consistent with a direction of positive and negative electrodes of the battery.

A wind power generation apparatus of the present disclosure includes: an acquisition unit, a wind turbine, a generator, an electric power storage unit, and a controller, wherein the acquisition unit is configured to acquire a wind power value; the controller is configured to control, according to the wind power value, the wind turbine to drive the generator to generate power and/or to drive the electric power storage unit to charge, comprising: if the wind power value is between a first wind power threshold value and a second wind power threshold value, the wind turbine only drives the generator to generate power; if the wind power value is greater than the second wind power threshold value, the wind turbine simultaneously drives the generator and the electric power storage unit to charge; if the wind power value is less than the first wind power threshold value, the wind turbine only drives the electric power storage unit to charge or drives the electric power storage unit to output induced electric energy to the outside, wherein the first wind power threshold value is less than the second wind power threshold value. The wind power generating device selects a suitable power generation mode according to the wind power value, and not only effectively balances the power supply to the grid during the peak period and the valley period of the wind power generation, but also directly converts the wind power into electrolytic energy, thus avoiding the energy conversion link, and reducing the energy loss.

Other features and advantages of embodiments of the present disclosure will be described in detail in the Detailed Description section that follows.

BRIEF DESCRIPTION OF DRAWINGS

The accompanying drawings are included to provide a further understanding of embodiments of the disclosure and constitute a part of this specification, and together with the detailed description below serve to explain, but not to limit, embodiments of the disclosure. In the accompanying drawings.

REFERENCE SIGNS

01—wind turbine;
02—generator;
03—transmission component;
04—electric power storage unit;
111—rotating shaft;
112—first pole shoe;
113—second pole shoe;
11—rotatable magnetic circuit;
12—annular battery;
121—battery diaphragm;
122—cathode plate;
123—anode plate; and
201—sub-cavity.

DETAILED DESCRIPTION OF THE EMBODIMENTS

A detailed description of embodiments of the disclosure will now be described with reference to the accompanying drawings. It should be understood that the specific embodiments described herein are merely illustrative and explana-
tory of the embodiments of the present disclosure, and are
not intended to limit the embodiments of the present dis-
closure.

Figure 1:
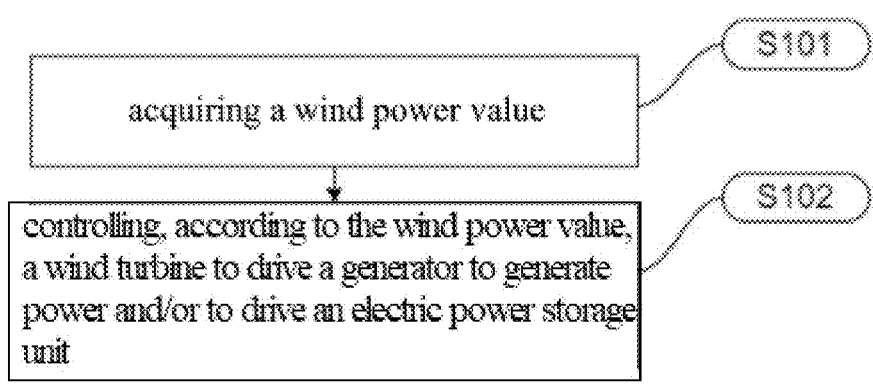
FIG. 1 is a schematic flow diagram of a wind power generation method according to the present disclosure.

FIG. 1 is a schematic flow diagram of a wind power
generation method according to the present disclosure. As
shown in FIG. 1, step S101 is to acquire a wind power value.
Wind speed is the forward speed of the wind, and the greater
the air pressure difference between two adjacent areas, the
faster the air flow, the greater the wind speed, and the greater
the force of the wind will naturally be. Therefore, the wind
is usually expressed by wind power, and the unit of wind
speed is expressed by how many meters per second or how
many kilometers per hour. The wind power value is the wind
speed value. In this application, the wind turbine is preferred
to collect wind power, and the wind speed value is deter-
mined according to the rotation of the wind turbine, so as to
obtain the wind power value. The wind power unit generally
operates at a variable speed, while the direct drive, semi-
direct drive or speed increase box generally does not regu-
late speed. The wind power generation in this application
mainly collects wind power values in the range of 2 m/s-25
m/s.

Step S102 is to select, according to the wind power value,
the wind turbine to drive the generator to generate power
and/or the wind turbine to drive the electric power storage
unit to charge, which specifically includes: if the wind power
value is between a first wind power threshold value and a
second wind power threshold value, the wind turbine only
drives the generator to generate power; if the wind power
value is greater than the second wind power threshold value,
the wind turbine simultaneously drives the generator and the
electric power storage unit to charge; and if the wind power
value is less than the first wind power threshold value, the
wind turbine only drives the electric power storage unit to
charge or drives the electric power storage unit to output
induced electric energy to the outside, wherein the first wind
power threshold value is less than the second wind power
threshold value. At this time, if the wind farm needs to
increase the power output, provided that the stored electric-
ity quantity of the electric power storage unit permits, the
power generation is simultaneously generated. The first
wind power threshold value is preferably 2-5 m/s, i.e. the
starting wind speed (cut-in wind speed) of the wind turbine.
The second wind power threshold value is preferably 10-25
m/s, i.e. the rated wind speed of the wind turbine. The
method can effectively solve the wind power waste caused
by the fact that the generator cannot completely convert
power generation due to excessive wind power or the
generator cannot be driven to generate power due to too
small wind power when collecting wind power for power
generation. The maximum wind receiving capacity of the
disclosure=the maximum wind receiving capacity of the
generator+the maximum wind receiving capacity of the
electric power storage unit.

The electric power storage unit includes a magnetic
circuit and at least one group of a battery; driving the electric
power storage unit to charge by the wind turbine includes:
driving relative rotation between the magnetic circuit and
the battery by wind turbine to form a rotating magnetic
field applied to the battery, and generating an induced
current under the rotating magnetic field by the battery for
charging the electric power storage unit; and the electric
power storage unit is also used for externally outputting
induced electric energy through a grid connection of an
inverter. The magnetic circuit generated by the pole shoes
passes through the battery, and the battery forms an induced potential and an induced current in a rotating magnetic field
generated by the magnetic circuit.

The magnetic circuit is a rotatable magnetic circuit used
for generating a magnetic field surrounding the battery; and
driving the electric power storage unit to charge by the wind
turbine further includes: driving the rotatable magnetic
circuit and/or the battery to rotate to generate a rotating
magnetic field by the wind turbine.

The shape of the battery is annular, or a plurality of
batteries form an annular shape. An electrolyte diaphragm is
provided inside the battery. A magnetic-curve of the rotat-
able magnetic circuit is not parallel to a rotational tangent
direction of the rotatable magnetic circuit, and the magnetic-
curve of the rotatable magnetic circuit and the rotational
tangent direction of the rotatable magnetic circuit are not
perpendicular to an electrolyte diaphragm; and the battery
generates an induced potential under the action of the
rotating magnetic field, and a direction of the induced
potential is consistent with a direction of positive and
negative electrodes of the battery. Preferably, the magnetic-
curve of the rotatable magnetic circuit is perpendicular to the
rotational tangent direction of the rotatable magnetic circuit,
and the magnetic-curve of the rotatable magnetic circuit and
the rotational tangent direction of the rotatable magnetic
circuit are parallel to the electrolyte diaphragm.

The battery (group) may contain an electrolyte, which
may be a raw material such as a high-purity organic solvent,
an electrolyte lithium salt, a necessary additive, and the like,
and a solvent, which may be water, formulated under certain
conditions and in a certain ratio. The battery diaphragm may
be a woven film, a non-woven film (non-woven fabric), a
microporous film, a composite film, a diaphragm paper, a
laminated film, or the like.

The housing material of the battery may be insulating
plastic or glass or the like.

The magnetic circuit includes a rotating shaft and at least
one pair of pole shoes; each pair of pole shoes includes two
pole shoes disposed above and below or right and left of the
battery for generating a magnetic field surrounding the
battery; and the rotating shaft is used for driving the battery
or pole shoes such that the battery generates an induced
current in the magnetic field, the induced current being used
for charging the battery.

The magnetic induction intensity of the magnetic circuit
is determined according to the wind force value, and the
magnetic induction intensity of the magnetic circuit can be
specifically adjusted according to the wind force value,
including adjusting the power supply current of the pole
shoe and the magnet according to the wind force value. The
method can reduce the magnetic circuit loss and maximize
the utilization of the electric power storage unit.

In order to solve the defects that the structure of the
electric power storage unit of the power supply balancing
apparatus in the prior art is too complex or the energy loss
in the energy conversion process is too large, the application
provides a wind power generation apparatus, and the appa-
ratus includes: an acquisition unit, a generator and a con-
troller, wherein the acquisition unit is used for acquiring a
wind power value; the controller is used for selecting,
according to the wind power value, the wind turbine to drive
the generator to generate power and/or the wind turbine to
drive the electric power storage unit to charge, including: if
the wind power value is between a first wind power thresh-
old value and a second wind power threshold value, the wind
turbine only drives the generator to generate power; if the
wind power value is greater than the second wind power
threshold value, the wind turbine simultaneously drives the generator and the electric power storage unit to charge; and if the wind power value is less than the first wind power threshold value, the wind turbine only drives the electric power storage unit to charge or drives the electric power storage unit to output induced electric energy to the outside, wherein the first wind power threshold value is less than the second wind power threshold value.

Figure 2:
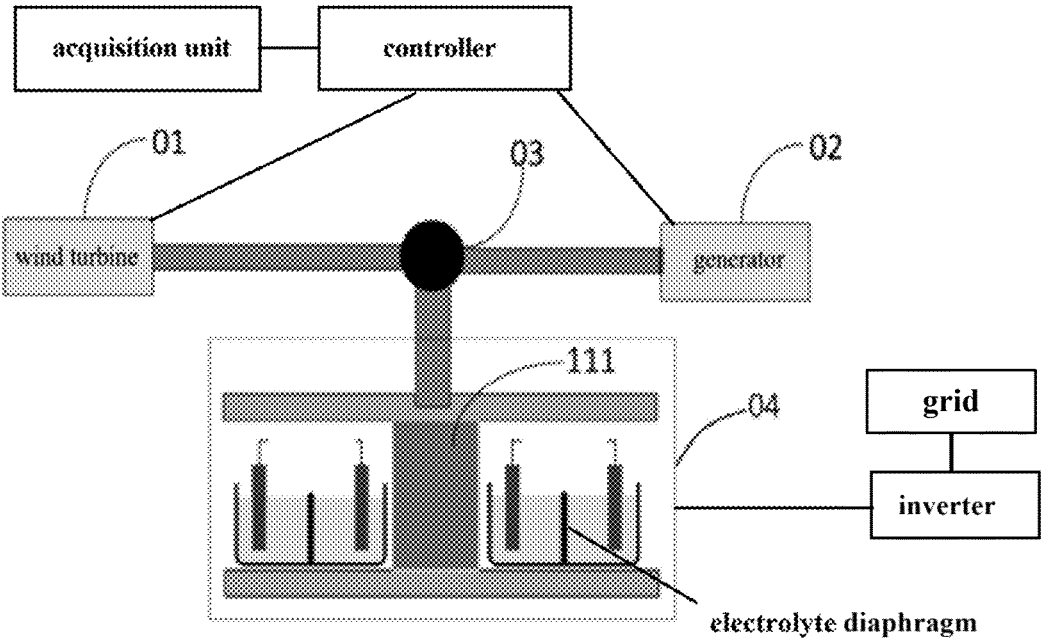
FIG. 2 is a structural schematic diagram of a wind power generation apparatus according to the present disclosure.

Specifically, FIG. 2 is a structural schematic diagram of a wind power generating apparatus of the present disclosure, and as shown in FIG. 2, the wind power generating apparatus includes a wind turbine 01, a generator 02, a transmission component 03, and an electric power storage unit 04.

Figure 3:
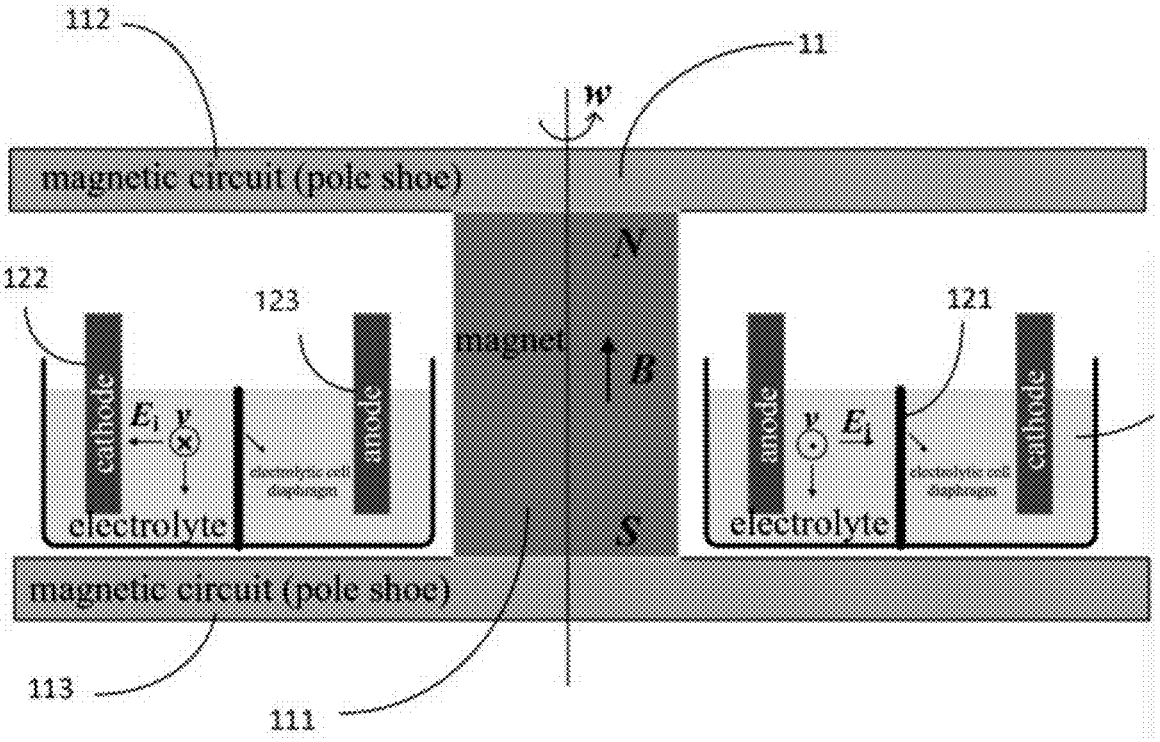
FIG. 3 is a structural schematic diagram of an electric power storage unit for wind power generation according to the present disclosure.

FIG. 3 is a structural schematic diagram of an electric power storage unit for wind power generation according to the present disclosure, as shown in FIG. 3, the electric power storage unit 04 includes a magnetic circuit and a battery (group), and wind-driven power generation of the electric power storage unit 04 includes driving relative rotation between the magnetic circuit and the battery (group) by the wind power to form a rotating magnetic field applied to the battery (group), and generating an induced current under the rotating magnetic field by the battery (group).

Specifically, the electric power storage unit 04 includes a rotatable magnetic circuit 11 for generating a magnetic field surrounding the battery and a battery provided with a cathode battery (group) and an anode battery (group). Power generation of the wind-driven electric power storage unit 04 includes: the wind power drives the rotatable magnetic circuit 11 and/or the battery to rotate to generate a rotating magnetic field, and the cathode battery (group) and the anode battery (group) generate an induced current in the rotating magnetic field. The shape of the battery is annular, i.e. the battery in the present application is preferably an annular battery 12 including a battery (group) and a battery diaphragm 121 for separating the battery (group) into a cathode battery (group) and an anode battery (group). The cathode battery (group) and the anode battery (group) are provided with a cathode plate 122 and an anode plate 123, respectively. The cathode plate 122 and the anode plate 123 are respectively provided with DC output interfaces for outputting the induced current.

The rotatable magnetic circuit includes a rotating shaft 111 and at least one pair of pole shoes. The pole shoes are provided at both ends of the battery for generating a magnetic field surrounding the battery. The rotating shaft 111 drives the battery or pole shoes for the battery to generate an induced current in the magnetic field. The rotatable magnetic circuit 11 includes a rotating shaft 111 passing through a ring hole of the annular battery 12 (i.e., a ring hole of the annular battery 12), and one or more pairs of pole shoes (e.g., a first pole shoe 112 and a second pole shoe 113) respectively located on both sides of and perpendicular to the battery diaphragm 121.

One end of the transmission component 03 is in transmission connection with the wind turbine 01, and two torque output ends of the other end of the transmission component 03 are respectively in transmission connection with the generator 02 and the rotating shaft 111 for alternatively driving or simultaneously driving the generator 02 and the rotating shaft 111. In practice, the transmission connection mode of the transmission component 03 to the generator 02 and the rotating shaft 111 may refer to a clutch connection mode, or a gear engagement mode. The driven rotating shaft 111 can rotate the pair of pole shoes on both sides of the annular battery 12. The rotation causes an induced potential and an induced current to be generated between the batteries (groups) on both sides of the battery diaphragm 121.

Both the generator 02 and the DC output interfaces are used for supplying power to the grid. The mechanical energy output of the wind turbine 01 for supplying energy to the grid will fluctuate, and if it is not adjusted, the electric energy output of the generator 02 will fluctuate accordingly. In the prior art, an electric power storage apparatus is generally provided to store electricity during the peak period of mechanical energy output from the wind turbine 01 to reduce power supply to the grid, and to maintain stability of power supply to the grid by auxiliary power supply from the electric power storage apparatus during the valley period of mechanical energy output from the wind turbine 01.

In the working principle of electrolytic power storage in the prior art, a DC power supply is generally used to supply power to two electrode plates in the battery to convert electric energy into chemical energy to realize power storage. That is to say, in the prior art, an AC-DC power transformation apparatus is needed to convert the AC power of the generator into DC power, and then charge the battery, so that the structure of the power supply balancing apparatus becomes complex, or the energy loss in the energy conversion process is too large.

In the embodiment of the disclosure, there is no need to set a DC power supply for the battery, but an induced potential and an induced current are directly generated between the batteries (groups) on both sides of the battery diaphragm, so that the batteries (groups) are electrolyzed. The working principle of the embodiment of the disclosure is that when the wind turbine 01 outputs mechanical energy, the rotating shaft of the rotating magnetic circuit 11 can be driven to rotate by the transmission component 03, and at this time, the two pole shoes adjacent to the cathode chamber and the anode chamber of the annular battery 12 are driven to rotate by the rotatable magnetic circuit 11. Since the annular battery 12 is fixed, when the pair of pole shoes rotates, the magnetic lines of the rotating magnetic field between the pair of pole shoes are cut by the battery (group) in the annular battery 12, thereby generating an induced potential and an induced current in the battery (group), thereby causing the battery (group) to undergo an electrochemical reaction.

Figure 4:
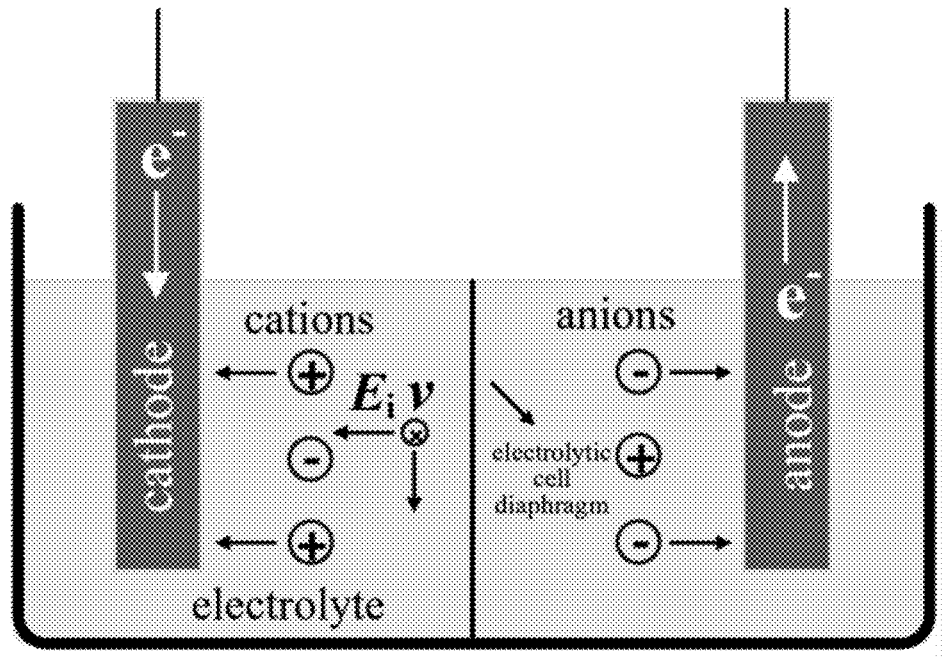
FIG. 4 is a cross-sectional structural diagram of an annular battery according to the present disclosure.

FIG. 4 is a cross-sectional structural diagram of an annular battery according to the present disclosure. As shown in FIG. 4, the cross-section of the annular battery 12 may be rectangular. In addition, the annular battery 12 may also be annular in cross-section. The battery (group) in the annular battery 12 needs to be divided into a cathode chamber and an anode chamber by the battery diaphragm 121. The direction in which the battery diaphragm 121 is arranged needs to be adapted to the two pole shoes of the pair of pole shoes in the rotatable magnetic circuit 11, that is, after the annular battery 12 is divided into the anode chamber and the cathode chamber by the battery diaphragm 121, two opposite pole shoes of the pair of pole shoes are positioned on the anode chamber side and the cathode chamber side, respectively, so that the magnetic-curve of the magnetic field between the pair of pole shoes are cut by the battery (group) in the annular battery 12 when the pair of pole shoes rotates.

Figure 5:
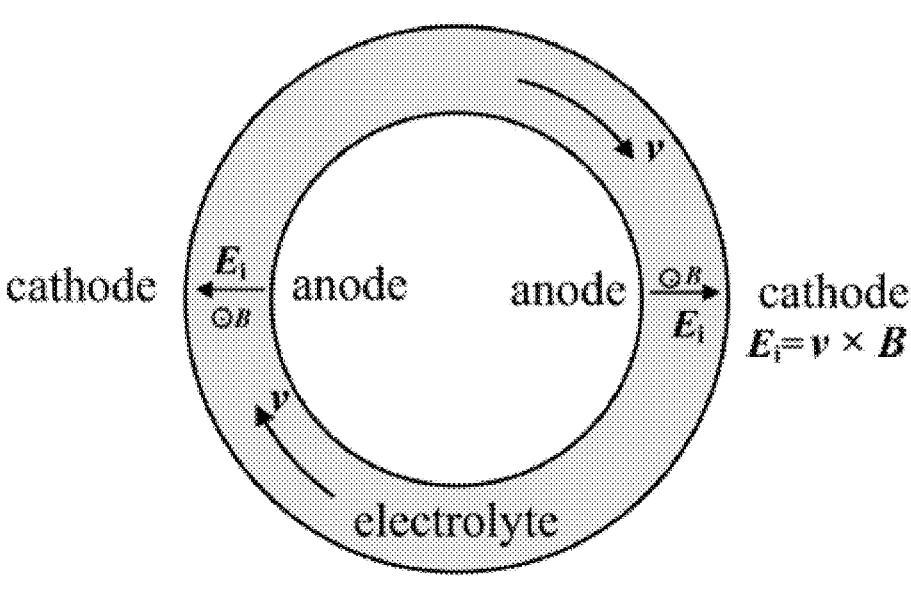
FIG. 5 is a schematic diagram of the working principle of the annular battery according to the present disclosure.

FIG. 5 is a schematic diagram of the working principle of the annular battery according to the disclosure, as shown in FIG. 5, as the pair of pole shoes rotates, the battery (group) within the annular battery 12 moves with respect to the magnetic field (magnetic induction intensity B) between the two pole shoes, the relative velocity is set to be v and perpendicular to the magnetic-curve, since the battery (group) is electrically conductive, an induced potential is generated in the battery (group): $E_i \dot{E}_1 = \vec{v} \times \dot{B}$, under the effect of the induced electric field $E_i$, cations in the battery (group) migrate towards the cathode and anions migrate towards the anode, resulting in a current density J of: $J = \gamma E_i$.

The battery (group) within the annular battery 12 undergoes electrolysis reactions at the cathode and anode, respectively. In contrast to the external DC power supply of the prior art, the electric field in the present disclosure is generated in the battery (group), whereas the electric field is externally applied by a DC power supply in the prior art. It should be noted that the magnet of the present disclosure may be a permanent magnet or electromagnet, and the permanent magnet is preferably a high energy storage permanent magnet.

Further, when the magnet is an electromagnet, there may be provided an electromagnetic control unit (not shown) which controls the electrolysis rate of the battery (group) by adjusting the magnetic induction intensity of the magnet. That is, the speed at which the electric power storage unit is charged is regulated in accordance with the wind power value, and in particular, the supply current of the electromagnet may be regulated in accordance with the wind power value so as to regulate the magnetic induction intensity of the magnetic circuit. Preferably, the anode and cathode plates may also be provided with an external voltage monitoring unit (not shown) to monitor the voltage of the battery to reflect the degree of charging.

Figure 6:
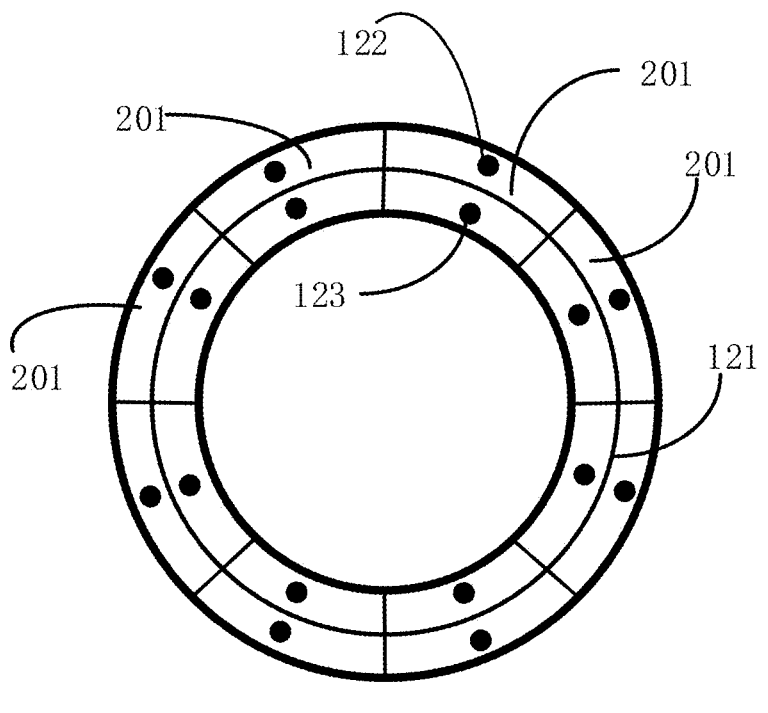
FIG. 6 is a structural schematic diagram of a sub-cavity of the annular battery according to the present disclosure.

FIG. 6 is a structural schematic diagram of a sub-cavity of the annular battery according to the present disclosure, as shown in FIG. 6, the inner cavity of the annular battery 12 of the present disclosure may further include a plurality of mutually independent sub-cavities 201 (i.e., a plurality of batteries or battery groups are constructed by the plurality of sub-cavities 201). Each sub-cavity 201 is provided with a battery diaphragm 121, a cathode plate 122, and an anode plate 123. In this way, each sub-cavity can act individually as a sub-battery. It should be noted that the number and size of the sub-cavities of the present disclosure can be set according to needs by those skilled in the art and are not specifically limited here. The transmission component further includes a rotation speed transmission mechanism (not shown), and the rotation speed transmission mechanism is provided between the wind turbine and the rotating shaft for controlling the rotation speed of the rotating shaft. The DC output interface may also be connected to an inverter (not shown) so that the output of AC power to the grid can be achieved.

To sum up, in the wind power generation device provided by the present disclosure, the battery is in an annular shape and a rotatable magnetic circuit capable of generating an induced potential and an induced current in the batteries (groups) between a cathode chamber and an anode chamber of the annular battery when rotating is disposed, so that the induced potential and the induced current for electrolytic storage of the battery (group) can be generated in the battery (group) by the mechanical energy drive of the wind turbine after the transmission component in transmission connection with the wind turbine is provided. Since the battery of the disclosure does not need to be provided with a DC power supply, the mechanical energy of the wind turbine can be directly converted into electrolytic energy, thus reducing the link of energy conversion, thereby effectively simplifying the structure of the electric power storage apparatus and reducing the energy loss caused by energy conversion.

The present disclosure may also arrange the battery diaphragm 121 to be parallel to the axial direction of the rotation shaft so as to divide the battery into an anode chamber on the side of an inner annular wall of the annular battery 12 and a cathode chamber on the side of an outer annular wall of the annular battery 12 (as shown in FIG. 4). Furthermore, depending on the direction of rotation of the rotatable magnetic circuit 11, it is also possible to divide the battery into a cathode chamber on the side of the inner annular wall of the annular battery 12 and an anode chamber on the side of the outer annular wall of the annular battery 12.

In order to adapt the pole shoes to the battery diaphragm 121, the rotatable magnetic circuit 11 may be configured such that the rotating shaft 111 passes as a magnet through a ring hole enclosed by the annular battery 12 and one or more pairs of pole shoes (e.g., a first pole shoe 112 and a second pole shoe 113 having a disk shape) are provided at both upper and lower ends of the rotating shaft 111, respectively. The annular battery 12 is located between the pair of pole shoes. Preferably, the outer edge of the disc-shaped pole shoe fits the outer edge of the annular battery 12.

The magnetic field B applied by the rotatable magnetic circuit 11 is perpendicular to the battery, the rotation of which can achieve magnetic field rotation. The magnetic induction intensity of the rotatable magnetic circuit 11 in the battery is B, and the rotational linear velocity is v. Since the battery (group) is relatively stationary and the magnetic field is relatively moving, the direction of v in the calculation formula of the induced electric field is opposite to the movement direction of the magnetic field. Taking FIG. 1 as an example, the induced electric field direction is directed from the inner ring to the outer ring, so that one side of the inner annular wall of the annular battery 12 is the anode chamber of the battery, and one side of the outer annular wall is the cathode chamber of the battery, that is, for the annular battery 12, as shown in FIG. 5, the inner side generates an anodic reaction and the outer side generates a cathodic reaction.

Figure 7:
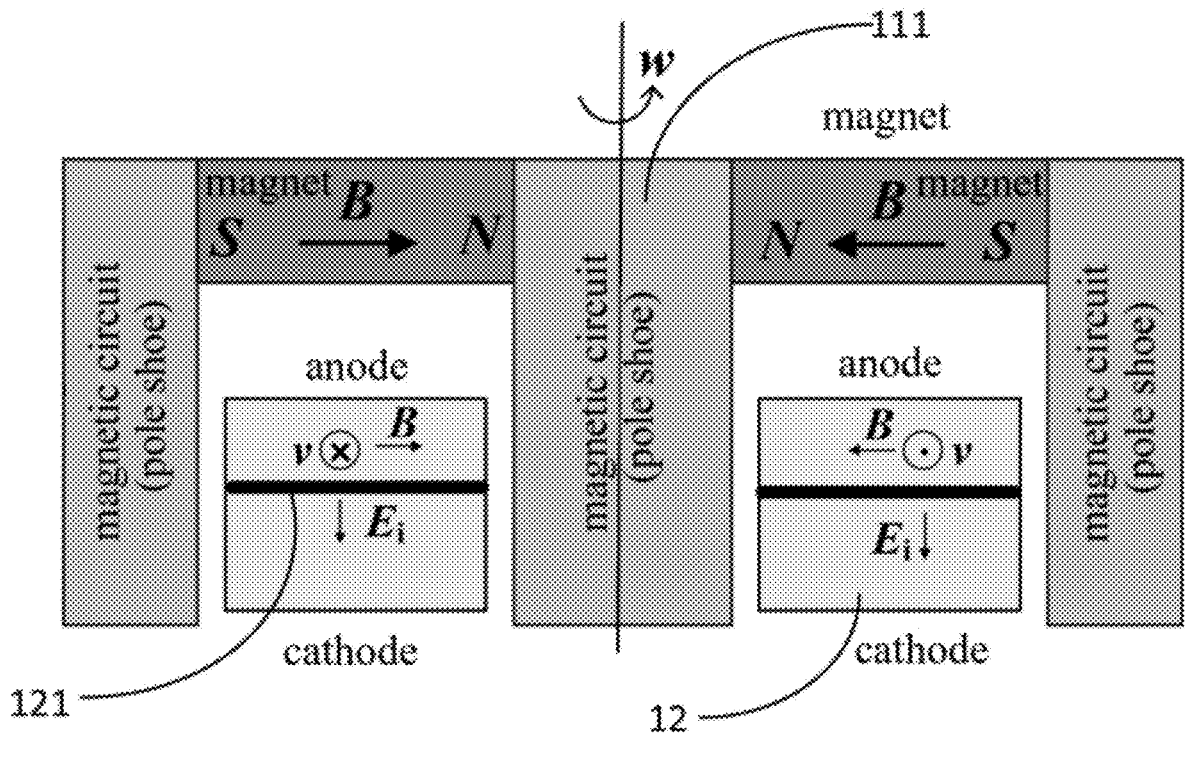
FIG. 7 is a schematic diagram of another annular battery according to the present disclosure.

FIG. 7 is a schematic diagram of another annular battery according to the present disclosure. As shown in FIG. 7, the battery diaphragm 121 may be provided perpendicular to the axial direction of the rotating shaft, so that the battery can be divided into an anode chamber on the side of the upper end of the annular battery 12 and a cathode chamber on the side of the lower end of the annular battery 12 (as shown in FIG. 5). Further, depending on the direction of rotation of the rotatable magnetic circuit 11, it is also possible to divide the battery into a cathode chamber on the side of the upper end of the annular battery 12 and an anode chamber on the side of the lower end of the annular battery 12.

In order to adapt the pair of pole shoes to the battery diaphragm 121, the rotatable magnetic circuit 11 may be configured such that: the rotating shaft 111 as one pole shoe of the pair of pole shoes of the rotatable magnetic circuit passes through a circular hole enclosed by the annular battery 12 and the upper end of the rotating shaft is sleeved with an annular magnet. The outer edge of the annular magnet is sleeved with another pole shoe in the form of a pipe section, and the annular battery 12 is located between the two pole shoes.

When the rotatable magnetic circuit in FIG. 7 is rotated counterclockwise, the magnetic-curve is oriented horizontally inward, and the induced electric field generated in the battery (group) (e.g., electrolyzed water) is oriented from top to bottom, and the battery has an anode chamber on the upper side and a cathode chamber on the lower side. The intermediate annular battery (group) diaphragm 121 isolates the generated gas and establishes an internal electric field.

The present disclosure also provides a wind power generation system, including a control mechanism and a power output balancing apparatus for wind power generation as described in the above embodiments; wherein the control mechanism is used to control the engagement and disengagement of the transmission component with the rotating shaft and/or the generator.

The two torque output ends at the other end of the transmission component are in transmission connection with the generator and the rotating shaft, respectively, for driving the generator and the rotating shaft alternatively or simultaneously, in particular: one end of the transmission component is in transmission connection with the wind turbine so that the power of the wind turbine can be transmitted; the other end of the transmission component includes two torque output ends which are respectively in transmission connection with the generator and the rotating shaft; the connection mode of the torque output end to the generator or to the rotating shaft may be a controllable connection, i.e. the generator or the rotating shaft may receive the drive of the torque output end through a contact connection as required or may disengage the drive of the torque output end as required.

In practice, it may be that during peak period of mechanical energy output by the wind turbine 01, the rotating shaft receives the drive of the torque output end through the contact connection, thereby reducing the supply of electricity to the grid through the battery (group) within the annular battery 12; and during the valley period of the mechanical energy output by the wind turbine 01, the rotating shaft is separated from the torque output end and the stability of the power supply to the grid is maintained by the auxiliary power supply of the power supply balancing apparatus.

In the present disclosure, the electric power storage apparatus is directly connected to the wind turbine, and there is no need to provide a DC power supply to output mechanical energy from the wind turbine, but the induced potential and the induced current are directly generated in the batteries (groups) on both sides of the battery diaphragm, so that the batteries (groups) are charged. The specific working principle is that when the wind turbine outputs mechanical energy, the rotating shaft of the rotating magnetic circuit 11 can be driven to rotate by the transmission component 03, and at this time, the pole shoes adjacent to the cathode chamber and the anode chamber of the annular battery 12 are driven to rotate by the rotatable magnetic circuit 11. Since the annular battery 12 is fixed, when the pair of pole shoes rotates, the rotating magnetic field between the pair of pole shoes is cut by the battery (group) in the annular battery 12, thereby generating an induced potential and an induced current in the battery (group), and further causing the battery (group) to undergo an electrochemical reaction.

Preferably, in an embodiment of the present disclosure, a processing unit and a monitoring unit may be further included, wherein the monitoring unit is used for acquiring direct power supply data of the generator in real time, and the processing unit is used for generating a control command of the control mechanism according to the direct power supply data and a preset rule.

In an embodiment of the disclosure, the direct supply data refers to power supply data of the generator to the grid, by the direct power supply data, it is possible to determine whether electric power storage is required and whether auxiliary power supply is required by the electric network according to the preset rule, and to generate a corresponding control command to determine the connection state of the two torque output ends to the generator or the rotating shaft and the connection state of the DC output interface to the grid.

Further, in an embodiment of the present disclosure, an electrolysis control unit (not shown) may also be included; the electrolysis control unit includes a monitoring assembly and a processing unit; the monitoring assembly is used for monitoring an electrolysis reaction speed of the battery (group); the processing unit is used for generating a rotation speed control command of the rotation speed transmission mechanism according to the electrolytic reaction speed; thus, the smoothness of the electric power storage process is achieved, and fluctuation of the electrolysis reaction is reduced.

Embodiment One

Figure 8:
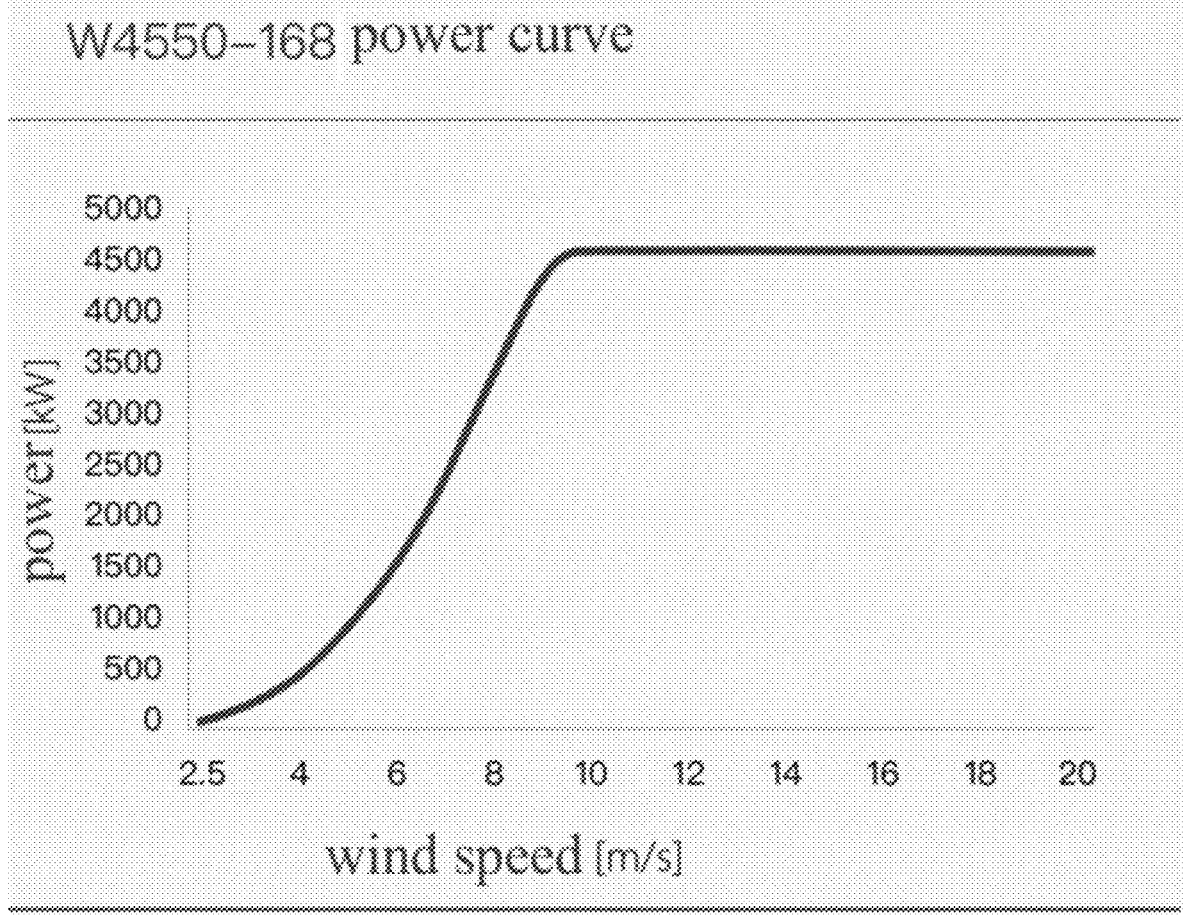
FIG. 8 is a curve graph of wind speed and driving power of Embodiment One of the wind power generation apparatus of the present disclosure.

The specific implementation parameters of the acquisition unit and the generator in the wind power generating apparatus of the present disclosure are shown in Tables 1-3 below, and the wind speed and driving power curves thereof are shown in FIG. 8.

TABLE 1

| Running data | |
| --- | --- |
| Rated power (kW) | 4550 |
| Cut-in wind speed (m/s) | 2.5 |
| Cut-out wind speed (m/s) | 20 |
| Windzone type | IECS |
| Running temperature (° C.) | −30 to +40 |
| Survival temperature (° C.) | −40 to +50 |
| Design life (year) | 20 |
| Wind turbine | |
| Wind turbine diameter (m) | 168 |
| Swept air area (m$^2$) | 22167 |
| Number of blades | 3 |
| Blade material | GDRP |

TABLE 2

| Pitching system | |
| --- | --- |
| Type | Electric Pitching |
| Pitch bearing | Rolling bearing |
| Gearbox | |
| Gearbox type | two-stage planetary + one-stage parallel axis |
| Gearbox lubrication mode | forced lubrication and splash lubrication |
| Gearbox oil filtering | online(reserved offline interface) |
| Generator | |
| Type | Asynchronous generator |
| Rated voltage | 1140 |
| Converter | |
| Rated voltage | 1140 |
| Net side frequency | 50 |
| Yaw system | |
| Type | Active yaw |
| Yaw form | Sliding yaw |
| Yaw drive | Electric yaw |
| Braking system | |
| Pneumatic brake system | Pneumatic braking |
| Mechanical braking system | Hydraulic mechanical braking |

TABLE 3

| Bearing component | |
| --- | --- |
| Main Bearing | Spherical roller bearing |

| Control system | |
| --- | --- |
| Control unit | PLC |
| Process control system | Programmable computer logic controller |
| Bus control type | Industrial real-time Ethernet |

| Tower | |
| --- | --- |
| Type | Conical tube-shaped |
| Hub center height | 105-160 m tower or customized according to site |
| Tower body | Structural steel; Mixed tower containing mixed tower barrel preforms |

Embodiment Two

Figure 9:
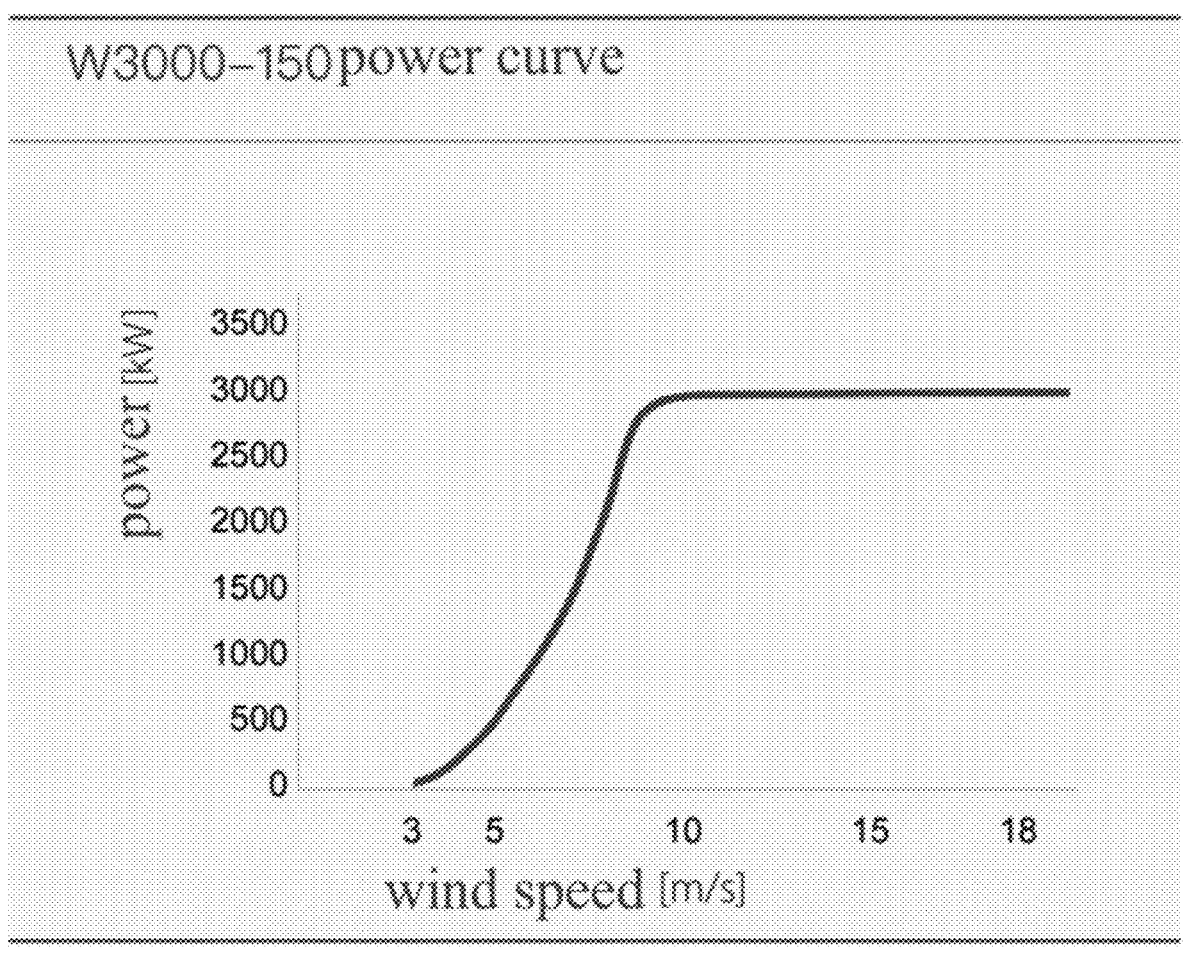
FIG. 9 is a curve graph of wind speed and driving power of Embodiment Two of the wind power generation apparatus of the present disclosure.

The specific implementation parameters of the acquisition unit and the generator in the wind power generating apparatus of the present disclosure are shown in Tables 4-6 below, and the wind speed and driving power curves thereof are shown in FIG. 9.

TABLE 4

| Running data | |
| --- | --- |
| Rated power (kW) | 3000 |
| Cut-in wind speed (m/s) | 3 |
| Cut-out wind speed (m/s) | 18 |
| Windzone type | IEC S |
| Running temperature (° C.) | [−20, +40](normal temperature) |
| | [−30, +40](Low temperature) |
| Survival temperature (° C.) | [−30, +50](normal temperature) |
| | [−40, +50](Low temperature) |
| Design life (year) | 20 |

| Wind turbine | |
| --- | --- |
| Wind turbine diameter (m) | 150 |
| Swept air area(m$^2$) | 17671 |
| Number of blades | 3 |
| Blade material | GFRP |

| Pitching system | |
| --- | --- |
| Type | Electric pitching |
| Pitching bearing | Rolling bearing |

| Drive chain | |
| --- | --- |
| Gearbox type | 2-stage planetary +1 -stage parallel axis |
| Gearbox lubrication mode | Forced + splash lubrication |
| Gearbox oil filtering | Online |

TABLE 5

| Generator | |
| --- | --- |
| Type | Asynchronous generator |
| Rated voltage | 1140 |

| Converter | |
| --- | --- |
| Rated voltage | 1140 |
| Grid frequency | 50 |

| Yaw system | |
| --- | --- |
| Type | Electric yaw |
| Yaw form | Sliding yaw |

| Braking system | |
| --- | --- |
| Primary braking | Pneumatic braking |
| Mechanical braking system | Hydraulic braking |

TABLE 6

| Carrier component | |
| --- | --- |
| Main bearing | Double-row spherical roller bearing |
| Nacelle cover (fairing) | GFRP |

| Control system | |
| --- | --- |
| Control unit | PLC |
| Process control system | Programmable computer logic controller |
| Bus control type | Industrial real-time Ethernet |

| Tower | |
| --- | --- |
| Type | Conical tube-shaped |
| Hub center height/m | 93-160 m Tower or customized according to site |
| Tower body | Structural steel; Mixed tower containing mixed tower barrel preforms |

Embodiment Three

Theoretically calculated data: induced potential=E=B*l*v;

Test data of the present application: magnetic induction intensity B=0.15 T, rotation speed v=1 m/s, induction body diameter d=10 cm, induction voltage E(U)=5 mV.

To sum up, it can be seen that the test results of the present application are consistent with theoretical data.

The present disclosure also provides a power output balancing apparatus for wind power generation, including a wind turbine, a generator, a transmission component and an electric power storage unit; the electric power storage unit includes a rotatable magnetic circuit and an annular battery; the annular battery is provided with a battery (group); the annular battery includes a battery diaphragm; the battery diaphragm is used for dividing the battery (group) into a cathode chamber and an anode chamber; the cathode chamber and the anode chamber are provided with a cathode plate and an anode plate, respectively; the cathode plate and the anode plate are respectively provided with DC output interfaces; the rotatable magnetic circuit includes a rotating shaft passing through a ring hole of the annular battery, and one or more pairs of pole shoes respectively positioned on two sides of and perpendicular to the battery diaphragm; one end of the transmission component is in transmission connection with the wind turbine, and two torque output ends of the other end of the transmission component are respectively in transmission connection with the electric generator and the rotating shaft for alternatively or simultaneously driving the electric generator and the rotating shaft; the driven rotating shaft is capable of rotating the pair of pole shoes on both sides of the annular battery; the rotation causes an induced potential and an induced current to be generated between the batteries (groups) on two sides of the battery diaphragm; the generator and the DC output interfaces are used for supplying power to the grid.

Preferably, in the present disclosure, when the battery diaphragm is provided parallel to an axial direction of the rotating shaft for dividing the battery (group) into inner and outer sides, the rotatable magnetic circuit is configured such that the rotating shaft passes through a circular hole formed by the annular battery as a magnet and pole shoes are provided at upper and lower ends of the rotating shaft, respectively, to form a pair of pole shoes; the annular battery is located between the pair of pole shoes.

Preferably, in the present disclosure, the pole shoe is disc-shaped and its outer edge fits the outer edge of an annular groove.

Preferably, in the present disclosure, the magnet includes a permanent magnet or an electromagnet. Preferably, in the present disclosure, the permanent magnet is a high energy storage permanent magnet.

Preferably, in the present disclosure, when the magnet is an electromagnet, the disclosure further includes:

an electromagnetic control unit used for controlling an electrolysis rate of the battery (group) by adjusting an electromagnetic intensity of the magnet.

Preferably, in the present disclosure, the annular battery includes a plurality of mutually independent sub-cavities; a battery diaphragm, a cathode plate, and an anode plate are disposed in each of the sub-cavities.

Preferably, in the present disclosure, the transmission component further includes a rotation speed transmission mechanism; and the rotation speed transmission mechanism is provided between the wind turbine and the rotating shaft for controlling the rotation speed of the rotating shaft.

Preferably, in the present disclosure, an inverter is further provided between the DC output interface and the grid.

In another aspect of the present disclosure, there is provided a power output balancing system for wind power generation including the power output balancing apparatus for wind power generation described above, and a control mechanism; and the control mechanism is used for controlling the engagement and disengagement of the transmission component from the rotating shaft and/or the generator.

Preferably, in the present disclosure, a processing unit and a monitoring unit are further included;

the monitoring unit is used for acquiring direct power supply data of the generator in real time; and the processing unit is used for generating a control command of the control mechanism according to the direct power supply data and a preset rule.

Compared with the prior art, the present disclosure has beneficial effects as follows:

as can be seen from the above solution, in the power output balancing apparatus for wind power generation of the present disclosure, the electric power storage unit includes a rotatable magnetic circuit and an annular battery, the rotatable magnetic circuit, when rotating, is capable of generating an induced potential and an induced current in the battery (group) between the cathode chamber and the anode chamber of the annular battery, in this way, after having a transmission component in transmission connection with the wind turbine, the induced potential and the induced current generated in the batteries (groups) for electrolysis of the battery (group) can be driven by the mechanical energy of the wind turbine, so that the mechanical energy is directly converted into chemical energy, thereby realizing electric power storage.

Since the battery of the present disclosure does not need to be provided with a DC power supply, it is possible to directly convert mechanical energy of a wind turbine into electrolytic energy, thereby reducing the energy conversion link, and further effectively simplifying the structure of the electric power storage unit and reducing the energy loss due to the energy conversion.

Optional implementations of embodiments of the present disclosure are described in detail above in conjunction with the accompanying drawings, however, the embodiments of the present disclosure are not limited to the specific details of the embodiments described above, and many simple variations can be made to the technical solutions of the embodiments of the present disclosure within the scope of the technical solution of the embodiments of the present disclosure, which all fall within the protection scope of the embodiments of the present disclosure.

It is further noted that the specific technical features described in the above specific embodiments can be combined in any suitable manner without contradiction. In order to avoid unnecessary repetition, embodiments of the present disclosure are not further described with respect to the various possible combinations.

It also needs to be noted that, the terms "includes," "including," or any other variation thereof, are intended to cover a non-exclusive inclusion, so that a process, method, commodity or equipment that includes a set of elements includes not only those elements but also other elements that are not explicitly listed or are inherent in such a process, method, commodity or equipment. In the absence of further limitations, the elements defined by the phrase "include an . . . " do not exclude the existence of other identical elements in the process, method, commodity or equipment in which the elements are included.

The above are only embodiments of the present application, and are not used to limit the present application. To those skilled in the art, various modifications and variations may be made to the present application. Any modifications, equivalents, modifications, etc. made within the spirit and principles of this application shall be included within the scope of the claims herein.

The invention claimed is:

1. A wind power generation apparatus, comprising:
an acquisition unit, a wind turbine, a generator, an electric power storage unit, and a controller, wherein;
the acquisition unit is configured to acquire a wind power value;
the electric power storage unit comprises a rotatable magnetic circuit and a plurality of batteries, wherein the rotatable magnetic circuit is configured to be rotated by the wind turbine and generate a magnetic field surrounding the plurality of batteries so as to generate an induced current in the and the plurality of batteries, and the electric power storage unit is connected to a grid through an inverter; and
the controller is configured to control, according to the wind power value, the wind turbine to drive the generator to generate power and/or to charge the electric power storage unit according to the following scheme:
when the wind power value is between a first wind power threshold value and a second wind power threshold value, the wind turbine only drives the generator to generate power;
when the wind power value is greater than the second wind power threshold value, the wind turbine drives the generator and the electric power storage unit is charged by the induced current;
when the wind power value is less than the first wind power threshold value, the wind turbine only charges the electric power storage unit by the induced electric current or only drives the electric power storage unit to output the induced electric current to the grid,
wherein the first wind power threshold value is less than the second wind power threshold value.

2. The wind power generation apparatus according to claim 1, wherein,
each battery is annular in shape, or the plurality of batteries form an annular shape.

3. The wind power generation apparatus according to claim 1, wherein,
the magnetic circuit comprises a rotating shaft and at least one pair of pole shoes;

each pair of pole shoes comprises a first and a second pole shoes disposed above and below or right and left of each battery, respectively; and the rotating shaft is configured to drive the battery or the pair of pole shoes so as to generate the induced current in the battery in the magnet field.

4. The wind power generation apparatus according to claim 3, wherein, the magnetic circuit generated by the pole shoes passes through the battery, and the battery forms an induced potential and the induced current in the rotating magnetic field.

5. The wind power generation apparatus according to claim 1, wherein, a magnetic-curve of the rotatable magnetic circuit are not parallel to a tangent direction of the rotation of the rotatable magnetic circuit, and the magnetic-curve of the rotatable magnetic circuit and the tangent direction of the rotation of the rotatable magnetic circuit are not perpendicular to an electrolyte diaphragm; and the battery generates an induced potential under the rotating magnetic field, and the induced potential has a direction consistent with a direction of positive and negative electrodes of the battery.

6. A wind power generation method, comprising:

acquiring a wind power value; and controlling, according to the wind power value, a wind turbine to:

only drive a generator to generate power when the wind power value is between a first wind power threshold value and a second wind power threshold value, to simultaneously drive the generator and to charge an electric power storage unit when the wind power value is greater than the second wind power threshold value, and only charge the electric power storage unit to charge or to output an induced electric energy to a grid, wherein the electric power storage unit comprises a rotatable magnetic circuit and a plurality of batteries, wherein the rotatable magnetic circuit is configured to be rotated by the wind turbine and generate a magnetic field surrounding the plurality of batteries so as to generate the induced energy in the and the plurality of batteries, and the electric power storage unit is connected to the grid through an inverter, and wherein the first wind power threshold value is less than the second wind power threshold value.

7. The wind power generation method according to claim 6, wherein, the first wind threshold is 2-5 m/s and the second wind threshold is 10-25 m/s.

8. The wind power generation method according to claim 6, further comprising: regulating a speed at which the electric power storage unit is charged according to the wind power value.

9. The wind power generation method according to claim 6, wherein, the magnetic circuit is a rotatable magnetic circuit configured to generate a magnetic field surrounding the battery; and driving the electric power storage unit to charge by the wind turbine further comprises: driving the rotatable magnetic circuit and/or the battery to rotate to generate the rotating magnetic field.

10. The wind power generation method according to claim 9, wherein, a magnetic-curve of the rotatable magnetic circuit are not parallel to a tangent direction of the rotation of the rotatable magnetic circuit, and the magnetic-curve of the rotatable magnetic circuit and the tangent direction of the rotation of the rotatable magnetic circuit are not perpendicular to an electrolyte diaphragm; and the battery generates an induced potential under the rotating magnetic field, and the induced potential has a direction consistent with a direction of positive and negative electrodes of the battery.

11. The wind power generation method according to claim 6, wherein, each battery is annular in shape, or the plurality of batteries form an annular shape.

12. The wind power generation method according to claim 6, wherein, the magnetic circuit comprises a rotating shaft and at least one pair of pole shoes;

each pair of pole shoes comprises a first and a second pole shoes disposed above and below or right and left of each battery, respectively; and the rotating shaft is configured to drive the battery or the pair of pole shoes so as to generate the induced current in the battery in the magnet field.

13. The wind power generation method according to claim 12, wherein, the magnetic circuit generated by the pole shoes passes through the battery, and the battery forms an induced potential and the induced current in the rotating magnetic field.

\* \* \* \* \*